(12) United States Patent
Wissel et al.

(10) Patent No.: US 12,482,110 B2
(45) Date of Patent: Nov. 25, 2025

(54) SYSTEMS AND METHODS FOR MEDICAL IMAGING

(71) Applicant: KONINKLIJKE PHILIPS N.V., Eindhoven (NL)

(72) Inventors: Tobias Wissel, Lübeck (NL); Irina Waechter-Stehle, Hamburg (DE); Scott Holland Settlemier, Marlborough, MA (US); Frank Michael Weber, Norderstedt (DE); Arne Ewald, Hamburg (DE); Matthias Lenga, Mainz (DE); Jochen Peters, Norderstedt (DE); André Goossen, Eldena (DE); Sebastian Wild, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 494 days.

(21) Appl. No.: 17/786,135

(22) PCT Filed: Dec. 10, 2020

(86) PCT No.: PCT/EP2020/085392
§ 371 (c)(1),
(2) Date: Jun. 16, 2022

(87) PCT Pub. No.: WO2021/122248
PCT Pub. Date: Jun. 24, 2021

(65) Prior Publication Data
US 2023/0360225 A1 Nov. 9, 2023

Related U.S. Application Data

(60) Provisional application No. 62/949,100, filed on Dec. 17, 2019.

(30) Foreign Application Priority Data

Jan. 7, 2020 (EP) .................................... 20150511

(51) Int. Cl.
*G06T 7/168* (2017.01)
*G06N 20/00* (2019.01)
(Continued)

(52) U.S. Cl.
CPC ............. *G06T 7/168* (2017.01); *G06N 20/00* (2019.01); *G06T 7/60* (2013.01); *G06T 11/00* (2013.01);
(Continued)

(58) Field of Classification Search
None
See application file for complete search history.

(56) References Cited

U.S. PATENT DOCUMENTS 5,997,479 A 12/1999 Savord et al.
6,013,032 A 1/2000 Savord
(Continued)

FOREIGN PATENT DOCUMENTS

EP 3376472 A1 9/2018

OTHER PUBLICATIONS

International Search Report and Written Opinion for PCT/EP2020/085392, Mailing date: Feb. 12, 2021, 15 Pages.
(Continued)

*Primary Examiner* — Wen W Huang (57) ABSTRACT

The invention provides a method for determining a confidence value for an image segmentation. The method includes obtaining an image, wherein the image comprises a view of an anatomical structure and a model of the anatomical structure is obtained, wherein the model comprises a plurality of nodes. The image is processed to
(Continued)

generate a plurality of image segmentation outputs, wherein each image segmentation output comprises a set of values for the view, wherein each value of the set of values is associated with a node of the plurality of nodes of the model. For each node of the model, a confidence value is determined based on the plurality of values corresponding to the node. A confidence map of the anatomical structure is generated based on the confidence value of each node.

14 Claims, 4 Drawing Sheets

(51) Int. Cl.
*G06T 7/60* (2017.01)
*G06T 11/00* (2006.01)
(52) U.S. Cl.
CPC ............... *G06T 2200/24* (2013.01); *G06T 2207/20021* (2013.01); *G06T 2207/20081* (2013.01); *G06T 2207/30004* (2013.01); *G06T 2210/41* (2013.01)

(56) References Cited

U.S. PATENT DOCUMENTS

| | | |
|---|---|---|
| 6,251,072 B1 | 6/2001 | Ladak et al. |
| 6,283,919 B1 | 9/2001 | Roundhill et al. |
| 6,443,896 B1 | 9/2002 | Detmer |
| 6,458,083 B1 | 10/2002 | Jago et al. |
| 6,530,885 B1 | 3/2003 | Entrekin et al. |
| 6,623,432 B2 | 9/2003 | Powers et al. |
| 2009/0067698 A1* | 3/2009 | Shinagawa ............... G06T 7/11 382/131 |
| 2011/0123095 A1* | 5/2011 | Florin ..................... G06T 7/149 382/154 |
| 2014/0341454 A1* | 11/2014 | Benameur ................ G06T 7/11 382/131 |
| 2016/0267673 A1* | 9/2016 | Grbic .................... G16H 30/40 |
| 2017/0032520 A1* | 2/2017 | Nitzken ................ G06T 7/0012 |
| 2018/0130213 A1* | 5/2018 | Yan ............................ G06T 7/10 |
| 2018/0182101 A1* | 6/2018 | Petersen .................. G06T 7/11 |
| 2019/0005737 A1* | 1/2019 | Auvray ................... G06T 19/20 |
| 2019/0325572 A1* | 10/2019 | Mansi ..................... A61B 5/103 |

OTHER PUBLICATIONS

Joskowicz, L. et al., "Automatic segmentation variability estimation with segmentation priors", Medical Image Analysis, 2018, vol. 50, pp. 54-64.

Abhinav K.Jha et al, "Practical no-gold standard evaluation framework for quantitative imaging methods: application to lesion segmentation in positron emission tomography", Journal of Medical Imaging, 2017, vol. 4, No. 1, 011011, 14 pages.

Warfield S. K. et al., "Simultaneous truth and performance level estimation (STAPLE): an algorithm for the validation of image segmentation", IEEE Trans Med Imaging., 2004, vol. 23, pp. 903-921.

Blanc, R. et al., "Confidence regions for statistical model based shape prediction from sparse observations", IEEE Trans Med Imaging, 2012, vol. 31, No. 6, pp. 1300-1310.

Ecabert, O. et al., "Automatic Model-Based Segmentation of the Heart in CT Images," IEEE Transactions on Medical Imaging, 2008, vol. 27, No. 9, pp. 1189-1201.

Nguyen, H. et al., "Identifying Low Confidence Mesh Regions: Uncertainty Measures and Segmentation", Proceedings of the 29th International Conference on Image and Vision Computing New Zealand, 2014, 6 pages.

Xu, K. et al., "Quality encoding for tetrahedral mesh optimization", Computers & Graphics, 2009, vol. 33, pp. 250-261.

* cited by examiner

SYSTEMS AND METHODS FOR MEDICAL IMAGING

CROSS-REFERENCE TO PRIOR APPLICATIONS

This application is the U.S. National Phase application under 35 U.S.C. § 371 of International Application No. PCT/EP2020/085392, filed on Dec. 10, 2020, which claims the benefit of U.S. Provisional Patent Application No. 62/949,100, filed on Dec. 17, 2019, and European Patent Application No. 20150511.2, filed on Jan. 7, 2020. These applications are hereby incorporated by reference herein.

FIELD OF THE INVENTION

The invention relates to the field of medical imaging, and more specifically to the field of automatic image segmentation.

BACKGROUND OF THE INVENTION

Model-based segmentation can delineate relevant anatomical structures in 3D images from a variety of imaging modalities. This is typically achieved by fitting a 3D surface mesh to the image data in a sequence of adaptation steps. The stepwise segmentation process, however, results in a single result that only corresponds to one sampled estimate from a distribution of possible outcomes for the imaged anatomy. The confidence of the result remains unknown to the user.

This is of particular importance for imaging modalities that are potentially subject to low signal-to-noise ratios or substantially changing noise patterns, such as for ultrasound imaging, or for imaging modalities that often lack parts of the actual image information, such as shadowing or imaging artefacts. Further, in magnetic resonance images, where the image acquisition protocol may have a significant influence on the image characteristics, and it is typically difficult for a segmentation model to be equally well trained on all image acquisition protocols.

SUMMARY OF THE INVENTION

The invention is defined by the claims.

According to examples in accordance with an aspect of the invention, there is provided a method for determining a confidence value for an image segmentation, the method comprising:
  obtaining an image, wherein the image comprises a view of an anatomical structure;
  obtaining a model of the anatomical structure, wherein the model comprises a plurality of nodes;
  processing the image to generate a plurality of image segmentation outputs, wherein each image segmentation output comprises a set of values for the view, wherein each value of the set of values is associated with a node of the plurality of nodes of the model;
  for each node of the model, determining a confidence value based on the plurality of values corresponding to the node; and
  generating a confidence map of the anatomical structure based on the confidence value of each node.

The method provides a means of generating a confidence value for a segmentation of an image.

By generating a plurality of segmentation results for each node of the anatomical structure model, it is possible to provide a confidence value for each node corresponding to the inverse variance across the plurality of results. Put another way, the higher the variance of a node, the lower the confidence value will be.

In this way, a user may be informed as to how accurate a segmentation of the anatomical structure may be and which features of the anatomical structure hold the lowest confidence value.

In an embodiment, the method further comprises:
  deriving a measurement of the anatomical structure based on one or more of the image segmentation outputs;
  identifying one or more of the plurality nodes that are associated with the measurement;
  calculating a measurement confidence value based on the confidence values of the one or more identified nodes associated with the measurement and/or the plurality of image segmentation outputs.

In this way, the confidence value of a measurement derived from the segmentation of the image may be calculated.

In an embodiment, processing the image comprises:
  applying a plurality of different transformations to the image, thereby generating a plurality of modified images;
  segmenting an image of the anatomical structure from each of the plurality of modified images, thereby generating a plurality of image segmentation outputs; and
  for each of the plurality of modified images, applying an inverse transformation to the modified image and the associated plurality of segmentation outputs, the inverse transformation representing the inverse of the transformation applied to the image.

In this way, it is possible to simulate movements of the anatomical structure that may occur during the acquisition of the image, meaning that the confidence map may account for movement artifacts in the image.

In a further embodiment, the plurality of different transformations comprises a plurality of random transformations.

In an embodiment, the plurality of different transformations differ according to a given statistical distribution.

In an embodiment, processing the image comprises performing a plurality of different segmentation operations on the image to segment an image of the anatomical structure, thereby generating a plurality of segmentation outputs.

In this way, it is possible to obtain a plurality of segmentation outputs in a computationally efficient manner as intensive volume transformations may be avoided.

In an embodiment, the plurality of different segmentation operations comprises applying a random perturbation during the segmentation process.

In an embodiment, the method further comprises training a machine learning algorithm using the plurality of segmentation outputs as a training set, wherein the machine learning algorithm is adapted to:
  obtain a single segmentation output of the image by way of a single segmentation operation, wherein the single segmentation output comprises a set of values for the view, wherein each value of the set of values is associated with a node of the plurality of nodes of the model; and
  for each node of the model, predict a confidence value based on the value corresponding to the node and the training set.

In this way, a machine learning algorithm may be trained and employed to increase the speed and efficiency of the method.

In a further embodiment, the machine learning algorithm is further adapted to:
  obtain a derived measurement of the anatomical structure based on the single image segmentation output;
  identify one or more of the plurality nodes that are associated with the derived measurement; and
  predict a measurement confidence value based on the one or more identified nodes associated with the derived measurements, the predicted confidence values of the one or more identified nodes associated with the derived measurement and/or the single image segmentation output.

In an embodiment, the method further comprises displaying the confidence map to a user.

In an embodiment, displaying the confidence map to the user comprises overlaying the confidence map on one or more of:
  the image; and
  a visual representation of the model.

In an embodiment, the image comprises one or more of:
  an ultrasound image;
  a magnetic resonance image;
  a positron emission tomography image; and
  an x-ray image.

According to examples in accordance with an aspect of the invention, there is provided a computer program comprising computer program code means which is adapted, when said computer program is run on a computer, to implement the methods described above.

According to examples in accordance with an aspect of the invention, there is provided a system for determining a confidence value for an image segmentation, the system comprising a processor adapted to:
  obtain an image, wherein the image comprises a view of an anatomical structure;
  obtain a model of the anatomical structure, wherein the model comprises a plurality of nodes;
  process the image to generate a plurality of image segmentation outputs, wherein each image segmentation output comprises a set of values for the view, wherein each value of the set of values is associated with a node of the plurality of nodes of the model;
  for each node of the model, determine a confidence value based on the plurality of values corresponding to the node; and
  generate a confidence map of the anatomical structure based on the confidence value of each node.

In an embodiment, the system comprises an imaging device, the imaging device comprising one or more of:
  an ultrasound device
  a magnetic resonance device;
  a positron emission tomography device; and
  an x-ray device.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a method for determining a confidence value for an image segmentation. The method includes obtaining an image, wherein the image comprises a view of an anatomical structure and a model of the anatomical structure is obtained, wherein the model comprises a plurality of nodes.

The image is processed to generate a plurality of image segmentation outputs, wherein each image segmentation output comprises a set of values for the view, wherein each value of the set of values is associated with a node of the plurality of nodes of the model. For each node of the model, a confidence value is determined based on the plurality of values corresponding to the node. A confidence map of the anatomical structure is generated based on the confidence value of each node.

Figure 1:
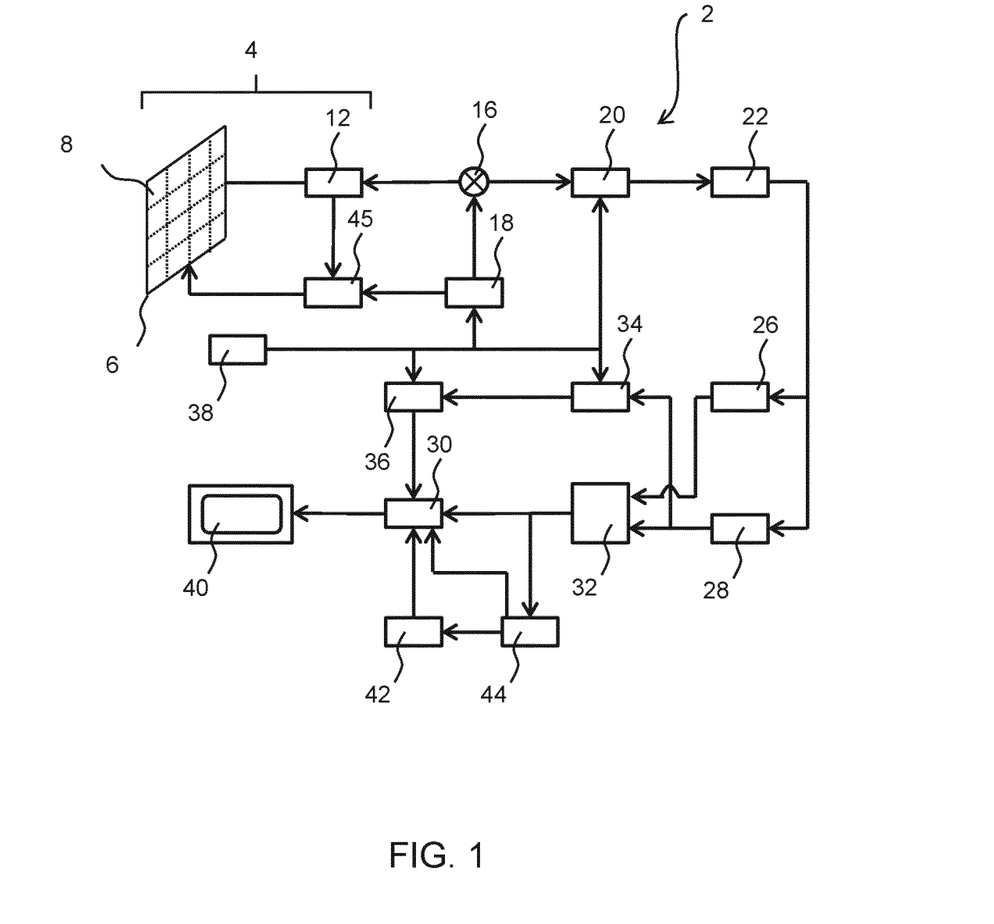
FIG. 1 shows an ultrasound diagnostic imaging system to explain the general operation.

The general operation of an exemplary ultrasound system will first be described, with reference to FIG. 1, and with emphasis on the signal processing function of the system since this invention relates to the processing of the signals measured by the transducer array.

It should be noted that the method of this invention may be used with any type of image and the below description relating to an ultrasound system is provided by way of example only.

The system comprises an array transducer probe 4 which has a transducer array 6 for transmitting ultrasound waves and receiving echo information. The transducer array 6 may comprise CMUT transducers; piezoelectric transducers, formed of materials such as PZT or PVDF; or any other suitable transducer technology. In this example, the transducer array 6 is a two-dimensional array of transducers 8 capable of scanning either a 2D plane or a three dimensional volume of a region of interest. In another example, the transducer array may be a 1D array.

The transducer array 6 is coupled to a microbeamformer 12 which controls reception of signals by the transducer elements. Microbeamformers are capable of at least partial beamforming of the signals received by sub-arrays, generally referred to as "groups" or "patches", of transducers as described in U.S. Pat. Nos. 5,997,479 (Savord et al.), 6,013,032 (Savord), and 6,623,432 (Powers et al.).

It should be noted that the microbeamformer is entirely optional. Further, the system includes a transmit/receive (T/R) switch 16, which the microbeamformer 12 can be coupled to and which switches the array between transmission and reception modes, and protects the main beamformer 20 from high energy transmit signals in the case where a microbeamformer is not used and the transducer array is operated directly by the main system beamformer. The transmission of ultrasound beams from the transducer array 6 is directed by a transducer controller 18 coupled to the microbeamformer by the T/R switch 16 and a main transmission beamformer (not shown), which can receive input from the user's operation of the user interface or control panel 38. The controller 18 can include transmission circuitry arranged to drive the transducer elements of the array 6 (either directly or via a microbeamformer) during the transmission mode.

In a typical line-by-line imaging sequence, the beamforming system within the probe may operate as follows. During transmission, the beamformer (which may be the microbeamformer or the main system beamformer depending upon the implementation) activates the transducer array, or a sub-aperture of the transducer array. The sub-aperture may be a one dimensional line of transducers or a two dimensional patch of transducers within the larger array. In transmit mode, the focusing and steering of the ultrasound beam generated by the array, or a sub-aperture of the array, are controlled as described below.

Upon receiving the backscattered echo signals from the subject, the received signals undergo receive beamforming (as described below), in order to align the received signals, and, in the case where a sub-aperture is being used, the sub-aperture is then shifted, for example by one transducer element. The shifted sub-aperture is then activated and the process repeated until all of the transducer elements of the transducer array have been activated.

For each line (or sub-aperture), the total received signal, used to form an associated line of the final ultrasound image, will be a sum of the voltage signals measured by the transducer elements of the given sub-aperture during the receive period. The resulting line signals, following the beamforming process below, are typically referred to as radio frequency (RF) data. Each line signal (RF data set) generated by the various sub-apertures then undergoes additional processing to generate the lines of the final ultrasound image. The change in amplitude of the line signal with time will contribute to the change in brightness of the ultrasound image with depth, wherein a high amplitude peak will correspond to a bright pixel (or collection of pixels) in the final image. A peak appearing near the beginning of the line signal will represent an echo from a shallow structure, whereas peaks appearing progressively later in the line signal will represent echoes from structures at increasing depths within the subject.

One of the functions controlled by the transducer controller 18 is the direction in which beams are steered and focused. Beams may be steered straight ahead from (orthogonal to) the transducer array, or at different angles for a wider field of view. The steering and focusing of the transmit beam may be controlled as a function of transducer element actuation time.

Two methods can be distinguished in general ultrasound data acquisition: plane wave imaging and "beam steered" imaging. The two methods are distinguished by a presence of the beamforming in the transmission ("beam steered" imaging) and/or reception modes (plane wave imaging and "beam steered" imaging).

Looking first to the focusing function, by activating all of the transducer elements at the same time, the transducer array generates a plane wave that diverges as it travels through the subject. In this case, the beam of ultrasonic waves remains unfocused. By introducing a position dependent time delay to the activation of the transducers, it is possible to cause the wave front of the beam to converge at a desired point, referred to as the focal zone. The focal zone is defined as the point at which the lateral beam width is less than half the transmit beam width. In this way, the lateral resolution of the final ultrasound image is improved.

For example, if the time delay causes the transducer elements to activate in a series, beginning with the outermost elements and finishing at the central element(s) of the transducer array, a focal zone would be formed at a given distance away from the probe, in line with the central element(s). The distance of the focal zone from the probe will vary depending on the time delay between each subsequent round of transducer element activations. After the beam passes the focal zone, it will begin to diverge, forming the far field imaging region. It should be noted that for focal zones located close to the transducer array, the ultrasound beam will diverge quickly in the far field leading to beam width artifacts in the final image. Typically, the near field, located between the transducer array and the focal zone, shows little detail due to the large overlap in ultrasound beams. Thus, varying the location of the focal zone can lead to significant changes in the quality of the final image.

It should be noted that, in transmit mode, only one focus may be defined unless the ultrasound image is divided into multiple focal zones (each of which may have a different transmit focus).

In addition, upon receiving the echo signals from within the subject, it is possible to perform the inverse of the above described process in order to perform receive focusing. In other words, the incoming signals may be received by the transducer elements and subject to an electronic time delay before being passed into the system for signal processing. The simplest example of this is referred to as delay-and-sum beamforming. It is possible to dynamically adjust the receive focusing of the transducer array as a function of time.

Looking now to the function of beam steering, through the correct application of time delays to the transducer elements it is possible to impart a desired angle on the ultrasound beam as it leaves the transducer array. For example, by activating a transducer on a first side of the transducer array followed by the remaining transducers in a sequence ending at the opposite side of the array, the wave front of the beam will be angled toward the second side. The size of the steering angle relative to the normal of the transducer array is dependent on the size of the time delay between subsequent transducer element activations.

Further, it is possible to focus a steered beam, wherein the total time delay applied to each transducer element is a sum of both the focusing and steering time delays. In this case, the transducer array is referred to as a phased array.

In case of the CMUT transducers, which require a DC bias voltage for their activation, the transducer controller 18 can be coupled to control a DC bias control 45 for the transducer array. The DC bias control 45 sets DC bias voltage(s) that are applied to the CMUT transducer elements.

For each transducer element of the transducer array, analog ultrasound signals, typically referred to as channel data, enter the system by way of the reception channel. In the reception channel, partially beamformed signals are produced from the channel data by the microbeamformer 12 and are then passed to a main receive beamformer 20 where the partially beamformed signals from individual patches of transducers are combined into a fully beamformed signal, referred to as radio frequency (RF) data. The beamforming performed at each stage may be carried out as described above, or may include additional functions. For example, the main beamformer 20 may have 128 channels, each of which receives a partially beamformed signal from a patch of dozens or hundreds of transducer elements. In this way, the signals received by thousands of transducers of a transducer array can contribute efficiently to a single beamformed signal.

The beamformed reception signals are coupled to a signal processor 22. The signal processor 22 can process the received echo signals in various ways, such as: band-pass filtering; decimation; I and Q component separation; and harmonic signal separation, which acts to separate linear and nonlinear signals so as to enable the identification of nonlinear (higher harmonics of the fundamental frequency) echo signals returned from tissue and micro-bubbles. The signal processor may also perform additional signal enhancement such as speckle reduction, signal compounding, and noise elimination. The band-pass filter in the signal processor can be a tracking filter, with its pass band sliding from a higher frequency band to a lower frequency band as echo signals are received from increasing depths, thereby rejecting noise at higher frequencies from greater depths that is typically devoid of anatomical information.

The beamformers for transmission and for reception are implemented in different hardware and can have different functions. Of course, the receiver beamformer is designed to take into account the characteristics of the transmission beamformer. In FIG. 1 only the receiver beamformers 12, 20 are shown, for simplicity. In the complete system, there will also be a transmission chain with a transmission micro beamformer, and a main transmission beamformer.

The function of the micro beamformer 12 is to provide an initial combination of signals in order to decrease the number of analog signal paths. This is typically performed in the analog domain.

The final beamforming is done in the main beamformer 20 and is typically after digitization.

The transmission and reception channels use the same transducer array 6 which has a fixed frequency band. However, the bandwidth that the transmission pulses occupy can vary depending on the transmission beamforming used. The reception channel can capture the whole transducer bandwidth (which is the classic approach) or, by using bandpass processing, it can extract only the bandwidth that contains the desired information (e.g. the harmonics of the main harmonic).

The RF signals may then be coupled to a B mode (i.e. brightness mode, or 2D imaging mode) processor 26 and a Doppler processor 28. The B mode processor 26 performs amplitude detection on the received ultrasound signal for the imaging of structures in the body, such as organ tissue and blood vessels. In the case of line-by-line imaging, each line (beam) is represented by an associated RF signal, the amplitude of which is used to generate a brightness value to be assigned to a pixel in the B mode image. The exact location of the pixel within the image is determined by the location of the associated amplitude measurement along the RF signal and the line (beam) number of the RF signal. B mode images of such structures may be formed in the harmonic or fundamental image mode, or a combination of both as described in U.S. Pat. No. 6,283,919 (Roundhill et al.) and U.S. Pat. No. 6,458,083 (Jago et al.) The Doppler processor 28 processes temporally distinct signals arising from tissue movement and blood flow for the detection of moving substances, such as the flow of blood cells in the image field. The Doppler processor 28 typically includes a wall filter with parameters set to pass or reject echoes returned from selected types of materials in the body.

The structural and motion signals produced by the B mode and Doppler processors are coupled to a scan converter 32 and a multi-planar reformatter 44. The scan converter 32 arranges the echo signals in the spatial relationship from which they were received in a desired image format. In other words, the scan converter acts to convert the RF data from a cylindrical coordinate system to a Cartesian coordinate system appropriate for displaying an ultrasound image on an image display 40. In the case of B mode imaging, the brightness of pixel at a given coordinate is proportional to the amplitude of the RF signal received from that location. For instance, the scan converter may arrange the echo signal into a two dimensional (2D) sector-shaped format, or a pyramidal three dimensional (3D) image. The scan converter can overlay a B mode structural image with colors corresponding to motion at points in the image field, where the Doppler-estimated velocities to produce a given color. The combined B mode structural image and color Doppler image depicts the motion of tissue and blood flow within the structural image field. The multi-planar reformatter will convert echoes that are received from points in a common plane in a volumetric region of the body into an ultrasound image of that plane, as described in U.S. Pat. No. 6,443,896 (Detmer). A volume renderer 42 converts the echo signals of a 3D data set into a projected 3D image as viewed from a given reference point as described in U.S. Pat. No. 6,530,885 (Entrekin et al.).

The 2D or 3D images are coupled from the scan converter 32, multi-planar reformatter 44, and volume renderer 42 to an image processor 30 for further enhancement, buffering and temporary storage for display on an image display 40. The imaging processor may be adapted to remove certain imaging artifacts from the final ultrasound image, such as: acoustic shadowing, for example caused by a strong attenuator or refraction; posterior enhancement, for example caused by a weak attenuator; reverberation artifacts, for example where highly reflective tissue interfaces are located in close proximity; and so on. In addition, the image processor may be adapted to handle certain speckle reduction functions, in order to improve the contrast of the final ultrasound image.

In addition to being used for imaging, the blood flow values produced by the Doppler processor 28 and tissue structure information produced by the B mode processor 26 are coupled to a quantification processor 34. The quantification processor produces measures of different flow conditions such as the volume rate of blood flow in addition to structural measurements such as the sizes of organs and gestational age. The quantification processor may receive input from the user control panel 38, such as the point in the anatomy of an image where a measurement is to be made.

Output data from the quantification processor is coupled to a graphics processor 36 for the reproduction of measurement graphics and values with the image on the display 40, and for audio output from the display device 40. The graphics processor 36 can also generate graphic overlays for display with the ultrasound images. These graphic overlays can contain standard identifying information such as patient name, date and time of the image, imaging parameters, and the like. For these purposes the graphics processor receives input from the user interface 38, such as patient name. The user interface is also coupled to the transmit controller 18 to control the generation of ultrasound signals from the transducer array 6 and hence the images produced by the transducer array and the ultrasound system. The transmit control function of the controller 18 is only one of the functions performed. The controller 18 also takes account of the mode of operation (given by the user) and the corresponding required transmitter configuration and band-pass configuration in the receiver analog to digital converter. The controller 18 can be a state machine with fixed states.

The user interface is also coupled to the multi-planar reformatter 44 for selection and control of the planes of multiple multi-planar reformatted (MPR) images which may be used to perform quantified measures in the image field of the MPR images.

Figure 2:
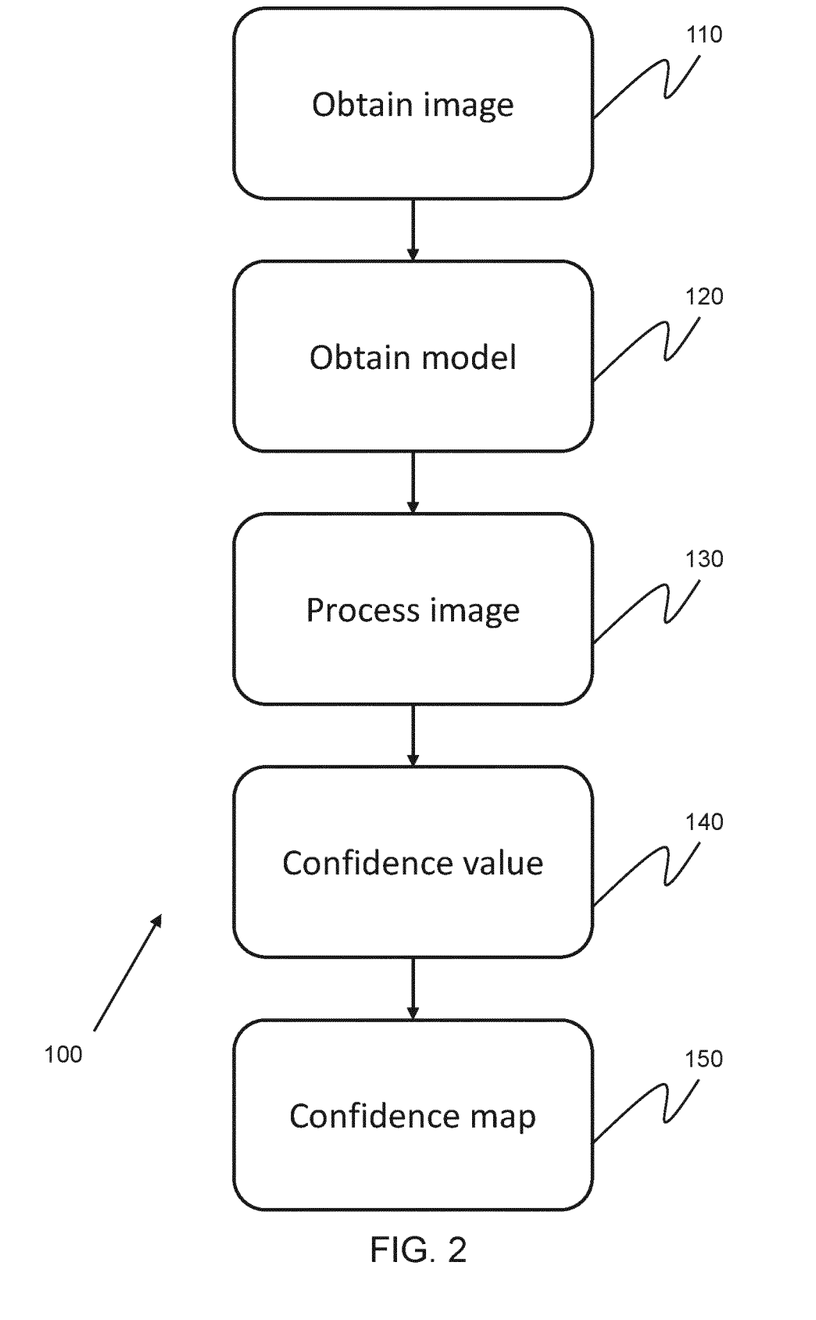
FIG. 2 shows a method of the invention.

FIG. 2 shows a method 100 for determining a confidence value for an image segmentation.

The method begins in step 110 an image is obtained, wherein the image comprises a view of an anatomical structure.

The image may comprise any image containing a view of an anatomical structure. For example, the image may comprise one or more of: an ultrasound image; a magnetic resonance image; a positron emission tomography image; and an x-ray image. The anatomical structure may be any anatomical object of interest, such as: a heart; a heart chamber; a cardiac valve; a vessel; an organ; a skeletal structure; and the like.

In step 120, a model of the anatomical structure is obtained, the model comprising a plurality of nodes. The model may be any representative model of the anatomical structure. For example, the model may be a polygon mesh model, wherein the plurality of nodes are the vertices of the polygon mesh model. In another example, the model may be a contour model, wherein the plurality of nodes are the vertices of connected line segments defined within a coordinates space (e.g. cartesian coordinates, polar coordinates).

In step 130, the image is processed to generate a plurality of image segmentation outputs, wherein each image segmentation output comprises a set of values for the view, wherein each value of the set of values is associated with a node of the plurality of nodes of the model.

In one example, processing the image includes: applying a plurality of different transformations to the image, thereby generating a plurality of modified images; segmenting an image of the anatomical structure from each of the plurality of modified images, thereby generating a plurality of image segmentation outputs; and for each of the plurality of modified images, applying an inverse transformation to the modified image and the plurality of image segmentation outputs associated with said image, the inverse transformation representing the inverse of the transformation applied to the image. This operation is described in further detail below with reference to FIG. 3.

In an alternative example, processing the image comprises performing a plurality of different segmentation operations on the image to segment an image of the anatomical structure, thereby generating a plurality of segmentation outputs. This operation is described in further detail below with reference to FIG. 4.

The examples of the schemes for processing the image may be used to train a machine learning algorithm.

A machine-learning algorithm is any self-training algorithm that processes input data in order to produce or predict output data. Here, the input data comprises image data and/or segmentation output values and the output data comprises confidence values of the segmentation output values. For example, the input data may comprise one or more of: an image feature; an image quality measure surrounding a node; information relating to whether the node is within the field of view of the image; a measure of local deviation from a prior shape; and the like.

Suitable machine-learning algorithms for being employed in the present invention will be apparent to the skilled person. Examples of suitable machine-learning algorithms include decision tree algorithms and artificial neural networks. Other machine-learning algorithms such as logistic regression, support vector machines or Naïve Bayesian model are suitable alternatives.

The structure of an artificial neural network (or, simply, neural network) is inspired by the human brain. Neural networks are comprised of layers, each layer comprising a plurality of neurons. Each neuron comprises a mathematical operation. In particular, each neuron may comprise a different weighted combination of a single type of transformation (e.g. the same type of transformation, sigmoid etc. but with different weightings). In the process of processing input data, the mathematical operation of each neuron is performed on the input data to produce a numerical output, and the outputs of each layer in the neural network are fed into the next layer sequentially. The final layer provides the output.

Methods of training a machine-learning algorithm are well known. Typically, such methods comprise obtaining a training dataset, comprising training input data entries and corresponding training output data entries. An initialized machine-learning algorithm is applied to each input data entry to generate predicted output data entries. An error between the predicted output data entries and corresponding training output data entries is used to modify the machine-learning algorithm. This process can be repeated until the error converges, and the predicted output data entries are sufficiently similar (e.g. ±1%) to the training output data entries. This is commonly known as a supervised learning technique.

For example, where the machine-learning algorithm is formed from a neural network, (weightings of) the mathematical operation of each neuron may be modified until the error converges. Known methods of modifying a neural network include gradient descent, backpropagation algorithms and so on.

The training input data entries correspond to example image data and/or segmentation output values. The training output data entries correspond to confidence values of the segmentation output values.

In particular, the method may include training a machine learning algorithm adapted to predict a confidence value for each of the nodes of the model. More specifically, when the image is processed using a single segmentation operation, which is the same type of segmentation operation used to generate the plurality of segmentation outputs described above, a machine learning algorithm may predict the confidence values for each node based on the value corresponding to the node and the training set.

In other words, the machine learning algorithm may be employed to predict a confidence value for the nodes of the model based on only a single segmentation operation, thereby removing the need to generate multiple segmentation outputs and so increasing the computational efficiency of the method.

In step 140, a confidence value is determined for each node of the model based on the plurality of values corresponding to the node.

The confidence value may be determined by way of a variance analysis module. The variance analysis module may operate by taking all of the segmentation outputs and estimating one confidence distribution per node, for example by generating histograms over the location in each of the Cartesian axes of the segmented images or over the distances along a specific spatial axis, such as the mean triangle normal.

Typically, the confidence distributions can be represented by parameters of fitted model distributions, such as the standard deviation or variance in case of fitting a normal distribution to each histogram. The confidence distributions can be visualized in terms of color overlays on top of the image, 3D renderings of the anatomical structure, or in view planes cutting through the volume. Finally, the fitted approximation of the confidence distributions and/or its parameters can be propagated to generate further abstract statistics, which are derived from the node locations.

In step 150, a confidence map of the anatomical structure is generated based on the confidence value of each node. The confidence map may then be displayed to a user, for example by overlaying the confidence map on the obtained image or an alternative visual representation of the anatomical structure or model.

The method provides an estimate of the confidence distribution for the nodes of the model to quantify the confidence of the segmentation result with respect to the given input image characteristics. On the most fundamental level, this is achieved by computing the locational variance of each mesh triangle with respect to small changes in the image input or segmentation process.

In addition, the method may include the steps of deriving a measurement of an anatomical structure based on one or more of the image segmentation outputs. For example, the image may be an image of a heart, wherein the anatomical structure is a left ventricle. In this case, the method may further derive the volume of the left ventricle based on the image segmentation outputs.

Further, the method may include calculating a measurement confidence value for the derived measurement, such as the volume of the left ventricle. The measurement confidence value may be calculated by determining the nodes of the model that are associated with the given measurement, for example, the nodes of the model that correspond to the left ventricle of the heart, and calculating the measurement confidence value based on the confidence values of those associated nodes.

For example, the covariance matrix for all of the nodes of the model may be stored in order to accurately derive the confidence of a derived measurement. Using only the single variances per node leads to an approximation of the covariance matrix with its diagonal; however, this will not always be correct, or possible.

Accordingly, as an alternatively, or in addition, to the confidence values of the nodes, the measurement confidence value may be calculated based on the plurality of segmentation outputs. Therefore, the measurement confidence value may be calculated based on the number of segmentation outputs, in particular in cases where the number of segmentation outputs is smaller than the number of nodes.

It should be noted that the machine learning algorithm described above may be adapted to predict the measurement confidence value in a similar manner to the prediction of the confidence values of the nodes.

Figure 3:
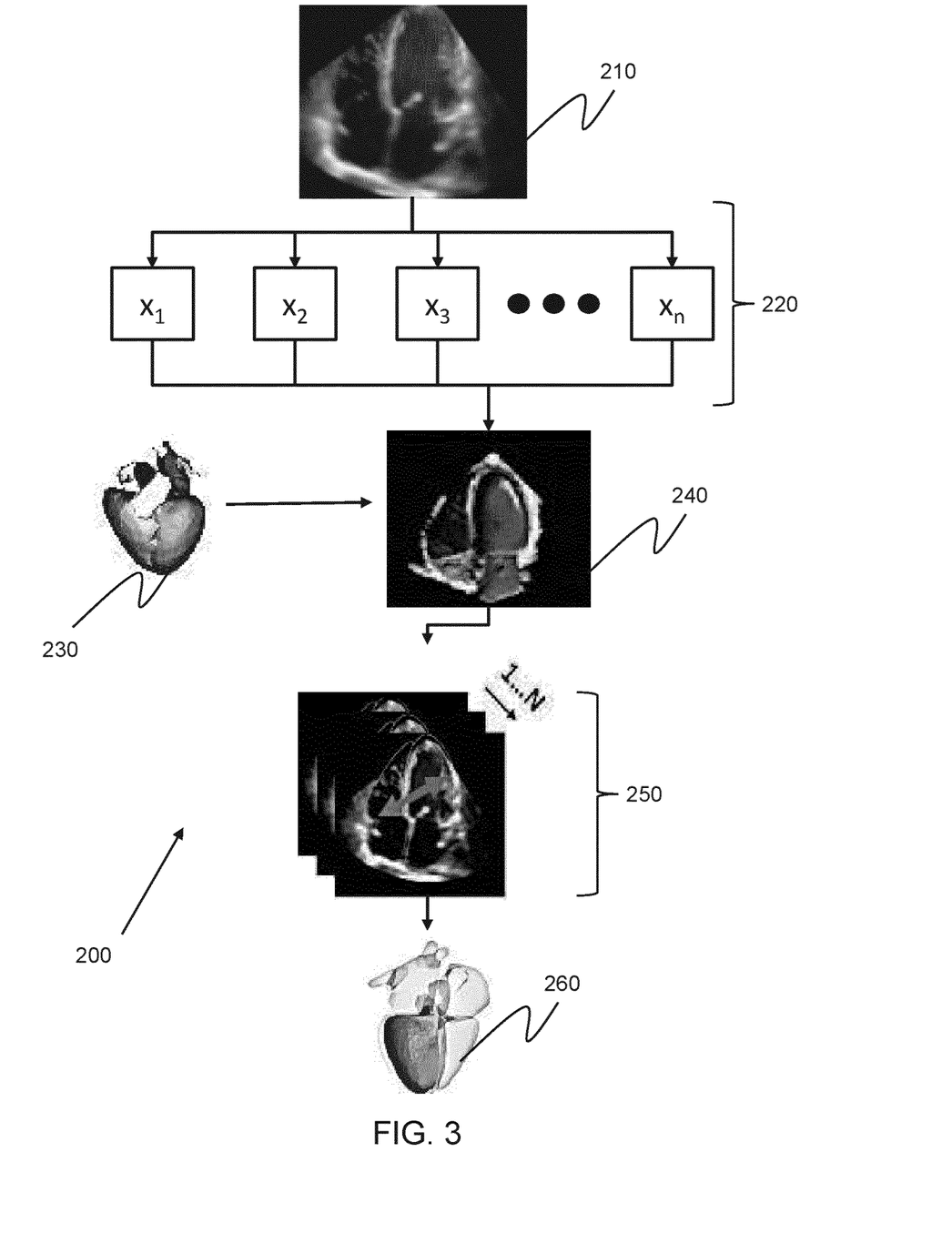
FIG. 3 shows an example of an image processing method according to an aspect of the invention based on changes in the image input.

FIG. 3 shows an example of an image processing method 200 according to an aspect of the invention based on changes in the image input.

An input image 210 is subject to N randomly sampled image modifiers 220 ($x_1, x_2, \ldots, x_n$) and a model 230 obtained, before each transformed image is processed by a step-wise segmentation workflow 240 yielding N surface meshes 250 of the transformed target structure. The variance analysis samples the surface meshes in a random Monte-Carlo (MC) fashion. Further the variance analysis applies inverse transformations, or image modifiers, to the surface meshes and approximates the confidence distributions for each node location. The application of the inverse image modifiers enable the variance analysis to be performed in a common space. Parameters or measures derived from these confidence distributions may then be visualized to the user, for example in the form of a confidence map overlaid on a 3D rendering of the anatomical structure 260.

The example shown in FIG. 3 illustrates an explicit way of evaluating the confidence of a segmentation. The image modifiers, or image transformations, which may be obtained from within the model capture range, may be applied to transform the image before segmenting it and finally transforming it back. The image transformations may include invertible geometric transformations, such as: a translation; a rotation; a shearing; a scaling; an elastic deformation; and the like, as well as an intensity transformation, such as: added noise; a gamma curve perturbation; a global contrast manipulation; and the like. The set of image transformations may represent imaging artifacts that may arise during the image acquisition process, which, for ultrasound imaging by way of example, may include changes in: probe angle; acquisition parameters; speckle noise; and the like. The image transformations that may be applied depend on the degrees of freedom of the segmentation models. For example, a translation requires fewer degrees of freedom than an elastic deformation.

For geometric distortions two considerations should be made. Firstly, the geometric image transformation must be applied again as its inverse after the segmentation of the transformed image in order to evaluate the confidence value in the same anatomic reference space. For example, after shrinking the image by 10%, the segmented image mesh size needs to be increased in the reverse way before the variance analysis is performed. Secondly, due to this inverse transformation, the chosen geometric image transformations should lie within the model capture range in order to avoid false positives in the confidence estimates. In particular, if a transformation is chosen for which it is impossible for the model to follow (due to geometric constraints in the workflow design), the inverse transformation applied to the segmentation result may introduce deformations that do not arise due to a low confidence value, but because of the model bias.

Figure 4:
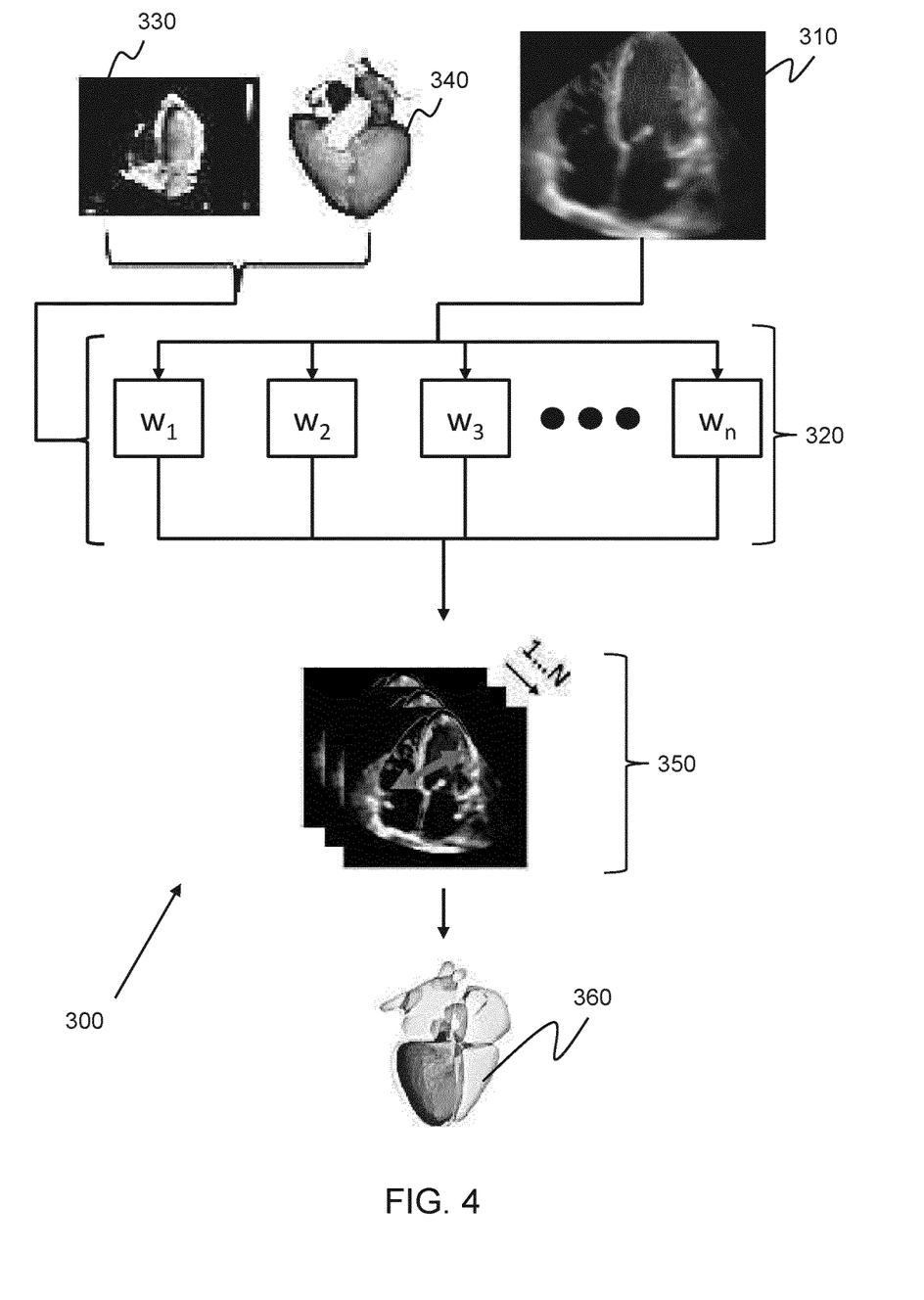
FIG. 4 shows an example of an image processing method according to an aspect of the invention based on changes in the segmentation workflow.

FIG. 4 shows an example of an image processing method 300 according to an aspect of the invention based on changes in the segmentation workflow.

The input image 310 is subject to N different segmentation workflows 320 ($w_1, w_2, \ldots, w_n$), where each workflow is generated by random modifications of the base segmentation workflow 330 and/or segmentation model 340. The process again results in N surface meshes 350 to which variance analysis can be applied to generate a confidence map of the anatomical structure 360.

The example shown in FIG. 4 generates a confidence map of the anatomical structure by slightly perturbing the segmentation process or changing the model definition. This approach avoids many time and computationally intensive volume transformations by exploiting workflow perturbations to trigger workflow sensitivities of the image segmentation, which mimic potential variations in the input image.

Segmentation workflow modifiers may trigger segmentation workflow sensitivities that would otherwise arise by the input image transformations described above. This does not involve changes in essential parts of the workflow design, such as removing spring forces from adaptation steps or changing the set of allowed model transformations (rigid, affine, multi-affine), for instance.

Rather an example of a potential segmentation workflow modifier is the de-activation of image feature detectors for a randomly sampled subset of model nodes, which simulates a weakening or loss of image information that could be used for model adaptation, for example due to shadowing or noise in ultrasound images.

In a further example, a segmentation workflow modifier may include a slight increment/decrement in the allowed number of iterations in an adaptation step, for example reducing the number of affine adaptations by 1. Such a segmentation workflow modifier may simulate a change in the image characteristics that changes the iterative distribution of identified target points, leading to a change in convergence speed.

In another example, the segmentation workflow modifier may include a perturbation of a shapefinder result by, for example, random translation or rotation. Such a segmentation workflow modifier may simulate slight changes in the shapefinder output due to slight changes in the image input.

In an example, the segmentation workflow modifier may include a perturbation of shape variation weights, i.e. the capability of the model to make use of deformations in certain shape eigenmode directions, or to start adaptation from them. Such a segmentation workflow modifier may simulate changing image characteristics leading to a deviating judgement about the participation of certain eigenmodes during adaptation.

The speed of the workflow shown in FIG. 4 may be increased by providing random perturbations of the final segmentation result, before repeating only the last step in the segmentation workflow. Typically, in model-based segmentation workflows the final step is a single deformable adaptation step (individual node motion is allowed under some internal energy constraints). Accordingly, the multiple segmentation outputs may be achieved with only one full segmentation and many single step adaptations, rather than many full segmentations.

Besides choosing the segmentation workflow modifiers, which will all add to the overall confidence estimate (and therefore can be pooled distribution-wise), the segmentation workflow modifiers may also be calibrated. The calibration of the segmentation workflow modifier may set the extent of parameter variation, such that the resulting confidence distributions resemble those that are realistic during a typical image acquisition. The calibration can therefore be done using a set of real-world Monte-Carlo samples, for example obtained by probe or acquisition parameter variations in the case of ultrasound image acquisition.

If absolute confidence measurements are not required, a relative confidence scale may be superimposed onto the confidence distributions and their parameters.

In all of the examples described above, Monte-Carlo sampling may be used to estimate confidence values. The use of Monte-Carlo sampling may lead to a time consuming application, which scales with the number of required Monte-Carlo samples. In an alternative approach, the Monte-Carlo samples for a set of images may be used as ground truth for mapping from data and segmentation to parameters of node-wise confidence distributions. Such a mapping may be learned by a statistical model, which may then be used as a non-iterative solution to generating the confidence values. The statistical model may also solve a mapping from data and segmentation results to the confidence values of any other derived statistic, such as cardiac chamber volume quantification in cardiac ultrasound imaging.

The statistical model may take a variety of inputs, including: the full image volume and surface mesh information, for example in the form of a bitmask; a set of 2D view planes cut through the image volume and surface mesh; a per node neighborhood volume block; a set of per node neighborhood volume blocks including the central node and its closest N topological neighbors; and the like. The statistical model may output: a set of confidence distribution parameters per node; and a set of confidence distribution parameters for a derived statistic.

The methods described above may be used for any application using model-based segmentation in any modality, including: ultrasound imaging; magnetic resonance imaging; computed tomography imaging; X-Ray imaging; mammography; and positron emission tomography. In particular, the methods may be used in imaging modalities where only parts of the relevant organ are imaged.

In acquired images, poor contrast, shadowing, varying speckle patterns, field of view coverage or acquisition windows may affect segmentation results of the same underlying anatomy. For example, the segmentations of the rectum or bladder in magnetic resonance images, are typically subject to substantial shape, size and pose variation across patients and scans. Here, the required large capture range of the segmentation model may also entail the risk of handling slightly varying anatomical structure appearance in an inconsistent manner. Moreover, shape variations are often due to different fill states and substances in the organ, which entail different intensity patterns in an imaging modality. In addition, intensity deviations from the training set of the segmentation model can originate from slight differences in the acquisition protocol, such that the same target structure might be handled with a different trajectory in the iterative segmentation process by the model.

The confidence values, and the confidence map, may be used to raise awareness of the user to potential weaknesses in the image acquisition process and also to guide the user in further acquisitions to improve the segmentation confidence. Further, the confidence values may increase the understanding of how reliably certain measures can be automatically quantified for a specific patient and indicate where additional investigations are needed for a more definite diagnosis or treatment decision.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

As discussed above, the processor, for instance a controller implements the control method. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and assodisciated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform at the required functions. Various storage media may be fixed within a processor or controller or may be transportable, such that the one or more programs stored thereon can be loaded into a processor or controller. While the invention has been illustrated and described in detail in the drawings and foregoing description, such illustration and description are to be considered illustrative or exemplary and not restrictive; the invention is not limited to the disclosed embodiments.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A method for determining a confidence value for an image segmentation, the method comprising:
   obtaining an image comprising a view of an anatomical structure;
   obtaining a model mesh of the anatomical structure, wherein the model mesh comprises a plurality of nodes, wherein the plurality of nodes comprises a first node;
   generating a plurality of meshes based on the image and the model mesh, wherein the plurality of meshes comprises a first mesh and a second mesh, wherein the first node in the first mesh comprises a first location and the first node in the second mesh comprises a second location;
   determining the confidence value for the first node based on a difference between the first location and the second location; and
   generating a confidence map of the anatomical structure based on the confidence value of the first node.

2. A method as claimed in claim 1,
   wherein the plurality of meshes is based on applying different transformations to the image,
   wherein generating the plurality of meshes comprises:
      generating a plurality of modified images from the different transformations to the image;
      segmenting the anatomical structure from each of the plurality of modified images; and
      for each of the plurality of modified images, applying an inverse transformation to the modified image and an associated mesh, the inverse transformation representing an inverse of a transformation applied to the image.

3. A method as claimed in claim 2, wherein the plurality of different transformations comprises a plurality of random transformations.

4. A method as claimed in claim 2, wherein the plurality of different transformations differ according to a given statistical distribution.

5. A method as claimed in claim 1, wherein generating the plurality of meshes comprises performing a plurality of different segmentation operations on the image to segment an image of the anatomical structure.

6. A method as claimed in claim 5, wherein performing the plurality of different segmentation operations comprises applying a random perturbation while the plurality of different segmentation operations is performed.

7. A method as claimed in claim 1, wherein the method further comprises displaying the confidence map to a user.

8. A method as claimed in claim 7, wherein displaying the confidence map to the user comprises overlaying the confidence map on one or more of:
   the image; or
   a visual representation of the model mesh.

9. A method as claimed in claim 1, wherein the image comprises one or more of:
   an ultrasound image;
   a magnetic resonance image;
   a positron emission tomography image; or
   an x-ray image.

10. A non-transitory computer-readable storage medium comprising computer program code which is adapted, when said computer program code is run on a computer, to implement the method of claim 1.

11. The method of claim 1,
   wherein the confidence map is based on a plurality of confidence values respectively associated with the plurality of nodes,
   wherein each of the plurality of confidence values is determined based on a respective difference between a location of a corresponding node in the first mesh and the location of the corresponding node in the second mesh.

12. A method as claimed in claim 11, wherein the method further comprises:
   deriving a measurement of the anatomical structure based on one or more of the plurality of meshes;
   identifying one or more of the plurality of nodes that are associated with the measurement; and
   calculating a measurement confidence value based on one or more confidence values of the one or more identified nodes associated with the measurement and/or the plurality of meshes.

13. A system for determining a confidence value for an image segmentation, the system comprising a processor adapted to:
   obtain an image comprising a view of an anatomical structure;

obtain a model mesh of the anatomical structure, wherein the model mesh comprises a plurality of nodes, wherein the plurality of nodes comprises a first node;

generate a plurality of meshes based on the image and the model mesh, wherein the plurality of meshes comprises a first mesh and a second mesh, wherein the first node in the first mesh comprises a first location and the first node in the second mesh comprises a second location;

determine the confidence value for the first node based on a difference between the first location and the second location; and generate a confidence map of the anatomical structure based on the confidence value of the first node.

14. A system as claimed in claim 13, further comprising an imaging device configured to obtain the image, wherein the imaging device comprises one or more of:
an ultrasound device
a magnetic resonance device;
a positron emission tomography device; or
an x-ray device.

\* \* \* \* \*